(12) United States Patent
Bangalore et al.

(10) Patent No.: US 7,711,543 B2
(45) Date of Patent: May 4, 2010

(54) ON-DEMAND LANGUAGE TRANSLATION FOR TELEVISION PROGRAMS

(75) Inventors: Srinivas Bangalore, Morristown, NJ (US); David Crawford Gibbon, Lincroft, NJ (US); Mazin Gilbert, Warren, NJ (US); Patrick Guy Haffner, Atlantic Highlands, NJ (US); Zhu Liu, Marlboro, NJ (US); Behzad Shahraray, Freehold, NJ (US)

(73) Assignee: AT&T Intellectual Property II, LP, New York, NY (US)

( * ) Notice: Subject to any disclaimer, the term of this patent is extended or adjusted under 35 U.S.C. 154(b) by 1055 days.

(21) Appl. No.: 11/279,852

(22) Filed: Apr. 14, 2006

(65) Prior Publication Data
US 2007/0244688 A1  Oct. 18, 2007

(51) Int. Cl.
*G06F 17/28* (2006.01)
(52) U.S. Cl. ............... 704/3; 704/2; 704/7; 704/8; 704/270; 704/277
(58) Field of Classification Search ............... 704/2, 704/3, 8, 257, 270, 277, 7
See application file for complete search history.

(56) References Cited

U.S. PATENT DOCUMENTS

| 2003/0046075 | A1 | 3/2003 | Stone | |
| 2003/0065503 | A1* | 4/2003 | Agnihotri et al. | 704/7 |
| 2003/0208352 | A1* | 11/2003 | Lee | 704/2 |
| 2003/0216922 | A1 | 11/2003 | Gonzales et al. | |
| 2005/0162551 | A1 | 7/2005 | Baker | |
| 2006/0136226 | A1* | 6/2006 | Emam | 704/277 |

* cited by examiner

Primary Examiner—Qi Han

(57) ABSTRACT

A method, a system and a machine-readable medium are provided for an on demand translation service. A translation module including at least one language pair module for translating a source language to a target language may be made available for use by a subscriber. The subscriber may be charged a fee for use of the requested on demand translation service or may be provided use of the on demand translation service for free in exchange for displaying commercial messages to the subscriber. A video signal may be received including information in the source language, which may be obtained as text from the video signal and may be translated from the source language to the target language by use of the translation module. Translated information, based on the translated text, may be added into the received video signal. The video signal including the translated information in the target language may be sent to a display device.

27 Claims, 4 Drawing Sheets

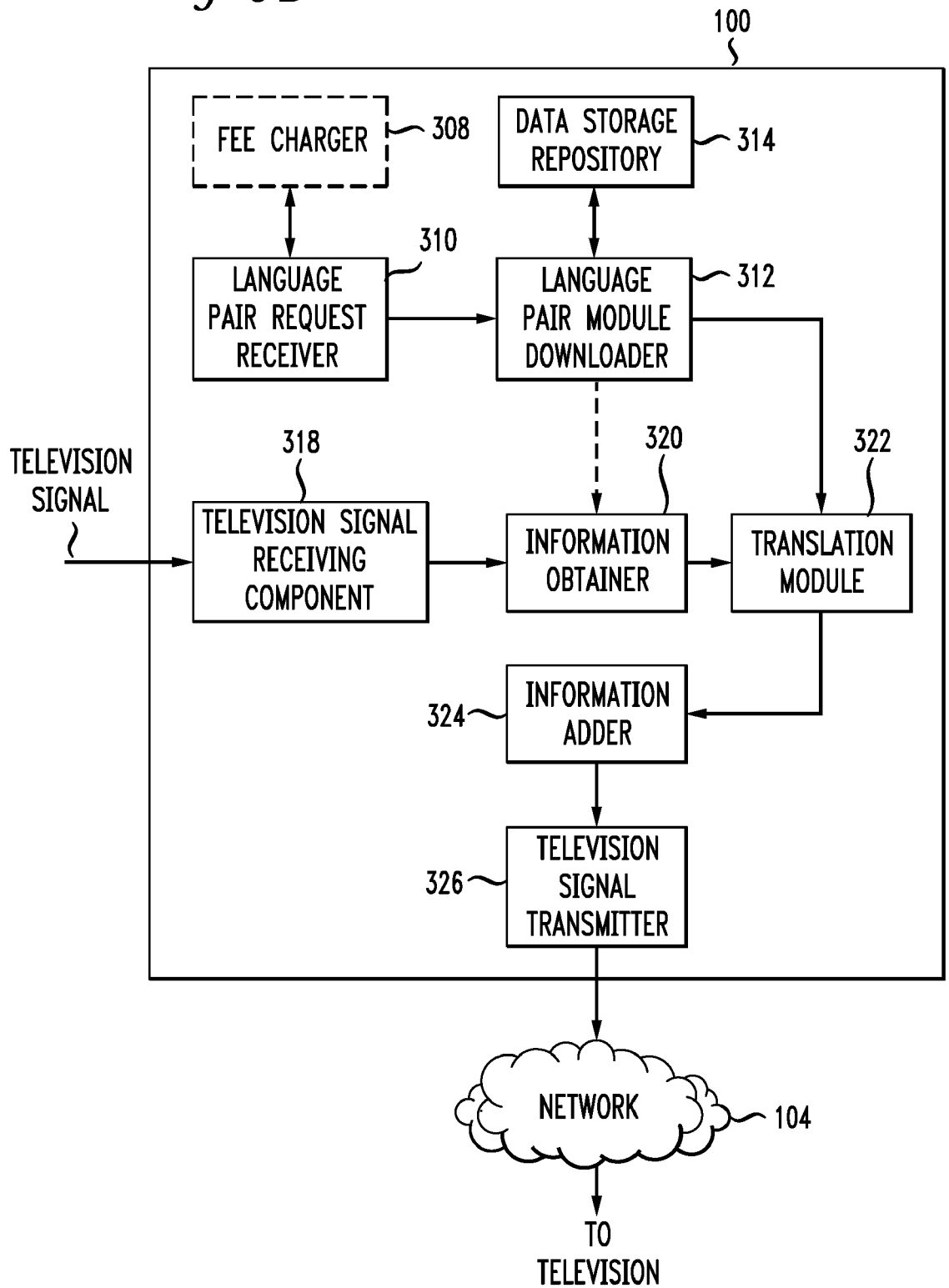

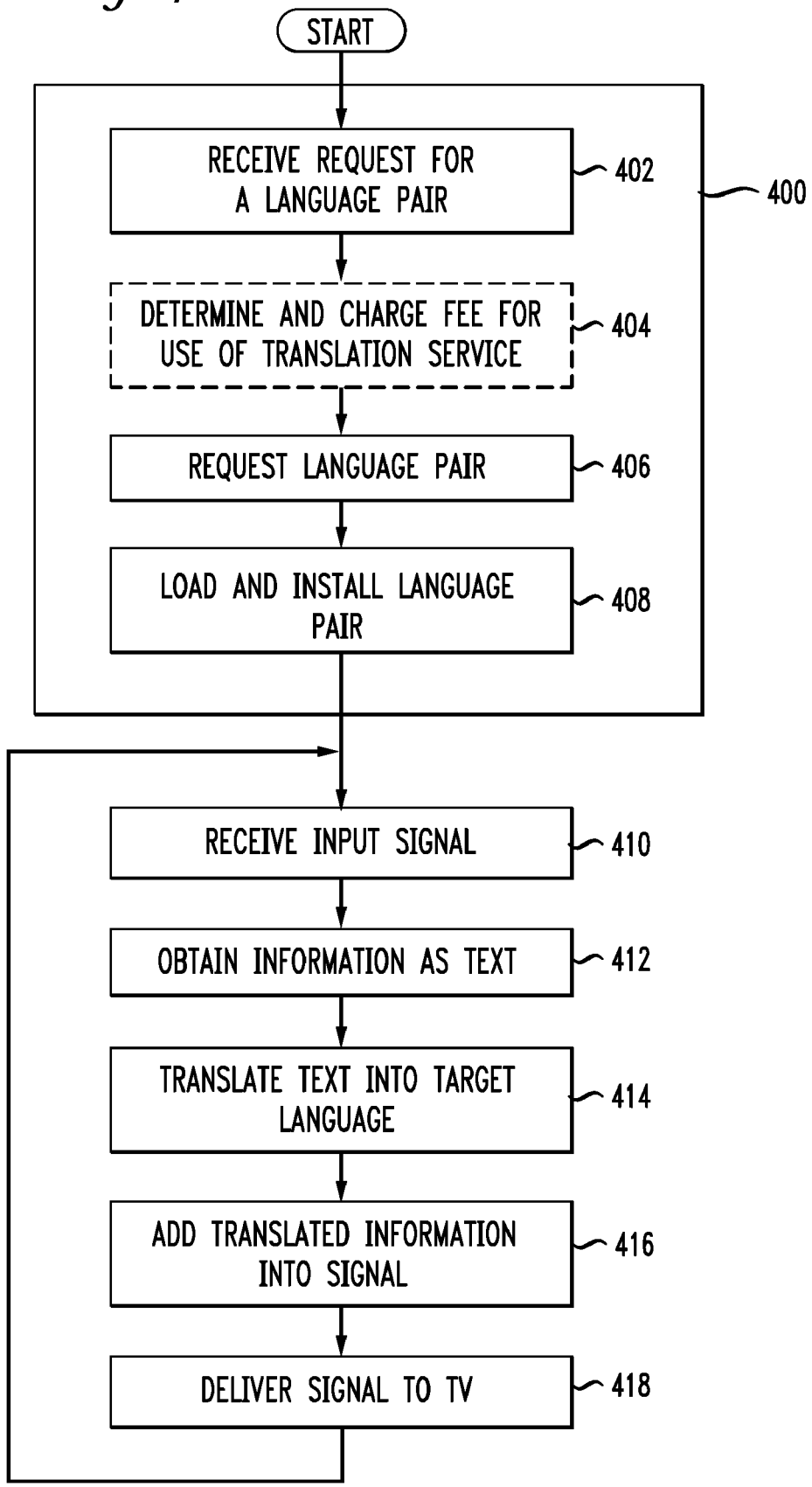

ON-DEMAND LANGUAGE TRANSLATION FOR TELEVISION PROGRAMS

BACKGROUND OF THE INVENTION

1. Field of the Invention

The present invention relates to automatic language translation from a source language to a target language, and in particular to methods, systems, and machine-readable media for use in translating information from television programs from a source language to a target language in real time.

2. Introduction

Anyone who has traveled to a foreign country, in which a language he or she understands is not spoken, has experienced a language barrier. Much news and entertainment is now received via television programs. Travelers who do not understand a local language are unable to obtain news or entertainment from media, such as local television programs. A service or device that makes television programs understandable to travelers who do not speak the local language is needed.

SUMMARY OF THE INVENTION

Additional features and advantages of the invention will be set forth in the description which follows, and in part wilt be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method for providing an on demand translation service may be provided. A translation module including at least one language pair module for translating a source language to a target language may be made available for use by a subscriber. The subscriber may be charged a fee for use of the requested on demand translation service or may be provided use of the on demand translation service for free in exchange for displaying commercial messages to the subscriber. A video signal may be received including information in the source language, which may be obtained as text from the video signal and may be translated from the source language to the target language by use of the translation module. Translated information based on the translated text may be added into the received video signal. The video signal including the translated information may be sent to a display device.

In a second aspect of the invention, a machine-readable medium having recorded thereon instructions for at least one processor to provide an on demand translation service may be provided. The machine-readable medium may include instructions for making available, for use by a subscriber, a translation module including at least one language pair module for translating a source language to a target language, one of instructions for charging the subscriber a fee for use of the on demand translation service or instructions for providing the on demand translation service to the subscriber for free in exchange for displaying commercial messages to the subscriber, instructions for receiving information in the source language from a video signal, instructions for obtaining the information as text from the video signal, instructions for translating the text from the source language to the target language, instructions for adding translated information based on the translated text into the received video signal, and instructions for sending the received video signal including the translated information to a display device.

In a third aspect of the invention, a system that provides an on demand translation service may be provided. The system may include a video signal receiving component configured to receive a television signal including an audio portion, where the audio portion includes speech in a source language, a speech recognizer configured to obtain the speech in the source language as text from the video signal, a translation module configured to translate the text from the source language to a target language for a subscriber using one of a plurality of language pair modules, an information adder configured to insert translated information based on the translated text into the video signal, and a video signal transmitter configured to transmit the video signal including the translated information.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3B illustrates a functional block diagram of the second embodiment of FIG. 1B; and FIG. 4 is a flowchart that illustrates exemplary processing that may be performed in implementations consistent with principles of the invention.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Overview

Television programs are broadcast with information in a source language. The information may be closed-captioning data for hearing-impaired television viewers, subtitles, speech, or other information. Implementations consistent with the principles of the invention may provide a service in which a television signal, including information in a source language, may be received. The information may be extracted from the television signal as text and the text may be translated from a source language to a target language. Translated information from the text in the target language may be added to the television signal and the television signal may be transmitted to a television. The translated information may be, for example, generated speech, closed captioning data, subtitles, or other information.

Exemplary on Demand Translation System

Figure 1A:
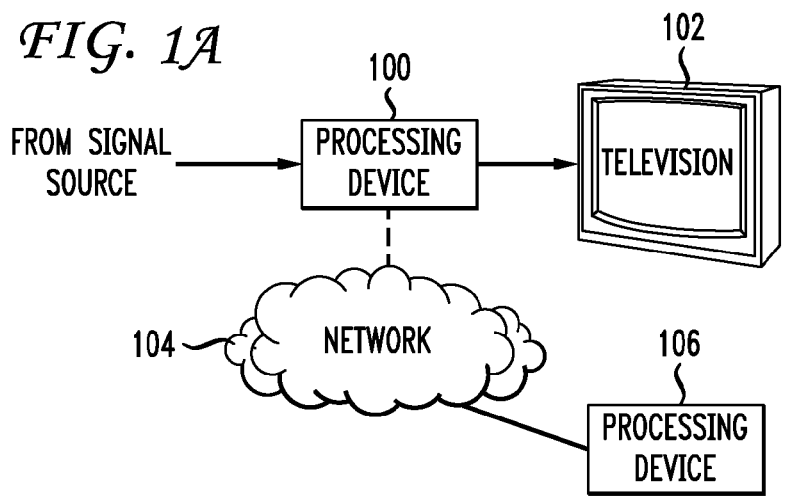
FIG. 1A illustrates an exemplary operating environment for a first embodiment of the invention.

FIG. 1A is a diagram illustrating an exemplary first embodiment of an on demand translation system for television programs. The exemplary system may include a processing device 100, a television 102, a network 104 and a processing device 106.

Processing device 100 may receive television signals from a signal source, such as, for example, a television signal transmitter, a cable, a satellite, or another source. Processing device 100 may obtain information in a source language from the television signal, translate the information from a source language to a target language, add translated information based on the target language text into the television signal and transmit the television signal with the translated information to television 102, where the television program may be viewed with the translated information.

In some implementations consistent with the principles of the invention, processing device 100 may require a language pair module for a language pair (source language/target language) of interest to a subscriber of the on demand translation service. A subscriber may send a request for a language pair module to processing device 106 via network 104. Network 104 may include one or more networks, such as the Internet, a local area network, a wide-area network, a Public-Switched Telephone Network (PSTN), an Ethernet network, an optical network, or other type of network. Processing device 106 may access a data storage repository which may include the requested language pair module and may download the language pair module to processing device 100.

In one implementation of the system of FIG. 1A, processing device 100 may be a laptop, notebook, or desktop computer. In another implementation of the system of FIG. 1A, processing device 100 may be a set-top box.

Processing device 106 may be a laptop, notebook, or desktop computer or other processing device.

Figure 1B:
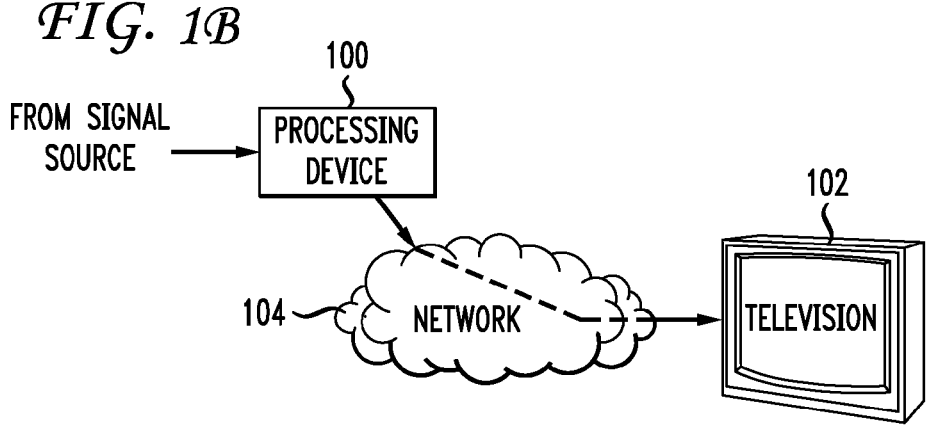
FIG. 1B illustrates an exemplary operating environment for a second embodiment of the invention.

FIG. 1B illustrates an exemplary system including a second embodiment consistent with the principles of the invention. The system may include processing device 100, television 102, and network 104.

In this implementation, processing device 100 may be located remotely from television 102. Processing device 100 may receive a television signal from a television signal source, such as, for example, a television signal transmitter, a cable, a satellite, or another source. Processing device 100 may obtain information as text from the television signal, translate the text from a source language to a target language, insert translated information based on the translated text into the television signal and transmit the television signal via network 104 to television 102. In this implementation, processing device 100 may have access to a data storage repository that may include a number of language pair modules, at least one of which processing device 100 may load to provide it with the ability to translate text of a source language to a target language.

Exemplary System

Figure 2:
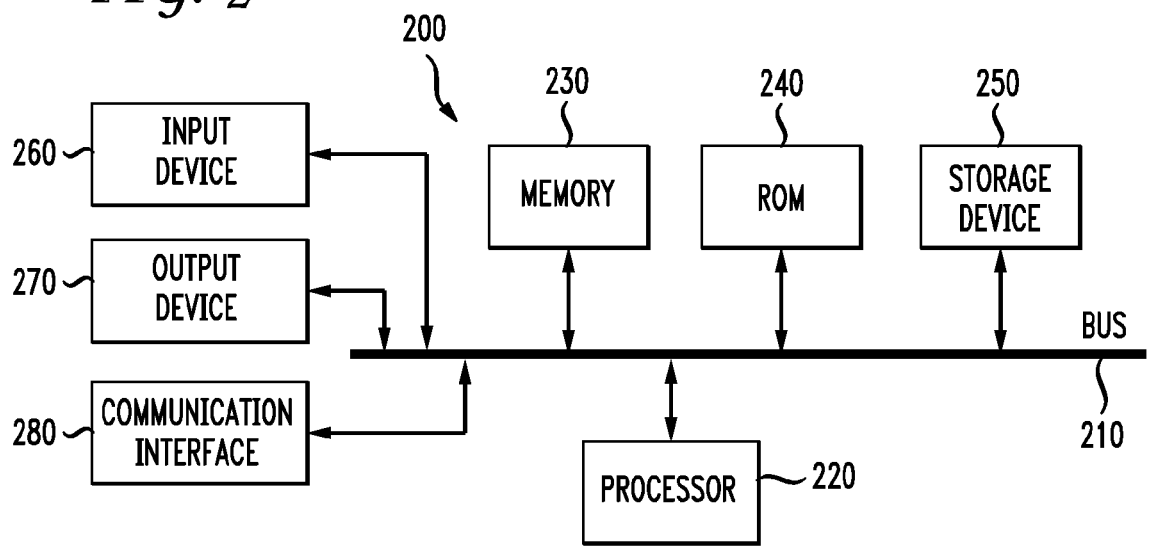
FIG. 2 illustrates a functional block diagram of a processing system that may be used to implement the first and second embodiments.

FIG. 2 illustrates an exemplary processing system 200 which may be used to implement processing device 100 and processing device 106. Processing system 200 may include a bus 210, a processor 220, a memory 230, a read only memory (ROM) 240, a storage device 250, an input device 260, an output device 270, and a communication interface 280. Bus 210 may permit communication among the components of processing system 200.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive. In one implementation of processing device 100 or 106, storage device 250 may include a data storage repository for a number of language pair modules.

Input device 260 may include one or more conventional mechanisms that permit a user to input information to system 200, such as a keyboard, a mouse, a pen, a voice recognition device, a microphone, a headset, etc. Output device 270 may include one or more conventional mechanisms that output information to the user, including a display, a printer, one or more speakers, a headset, or a medium, such as a memory, or a magnetic or optical disk and a corresponding disk drive. Communication interface 280 may include any transceiver-like mechanism that enables processing device 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections.

Processing system 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Processing system 200 may be, for example, a personal computer (PC), or any other type of processing device capable of processing textual or speech data. In alternative implementations, such as, for example, a distributed processing implementation, a group of processing devices 200 may communicate with one another via a network such that various processors may perform operations pertaining to different aspects of the particular implementation.

Embodiments of the Invention

Figure 3A:
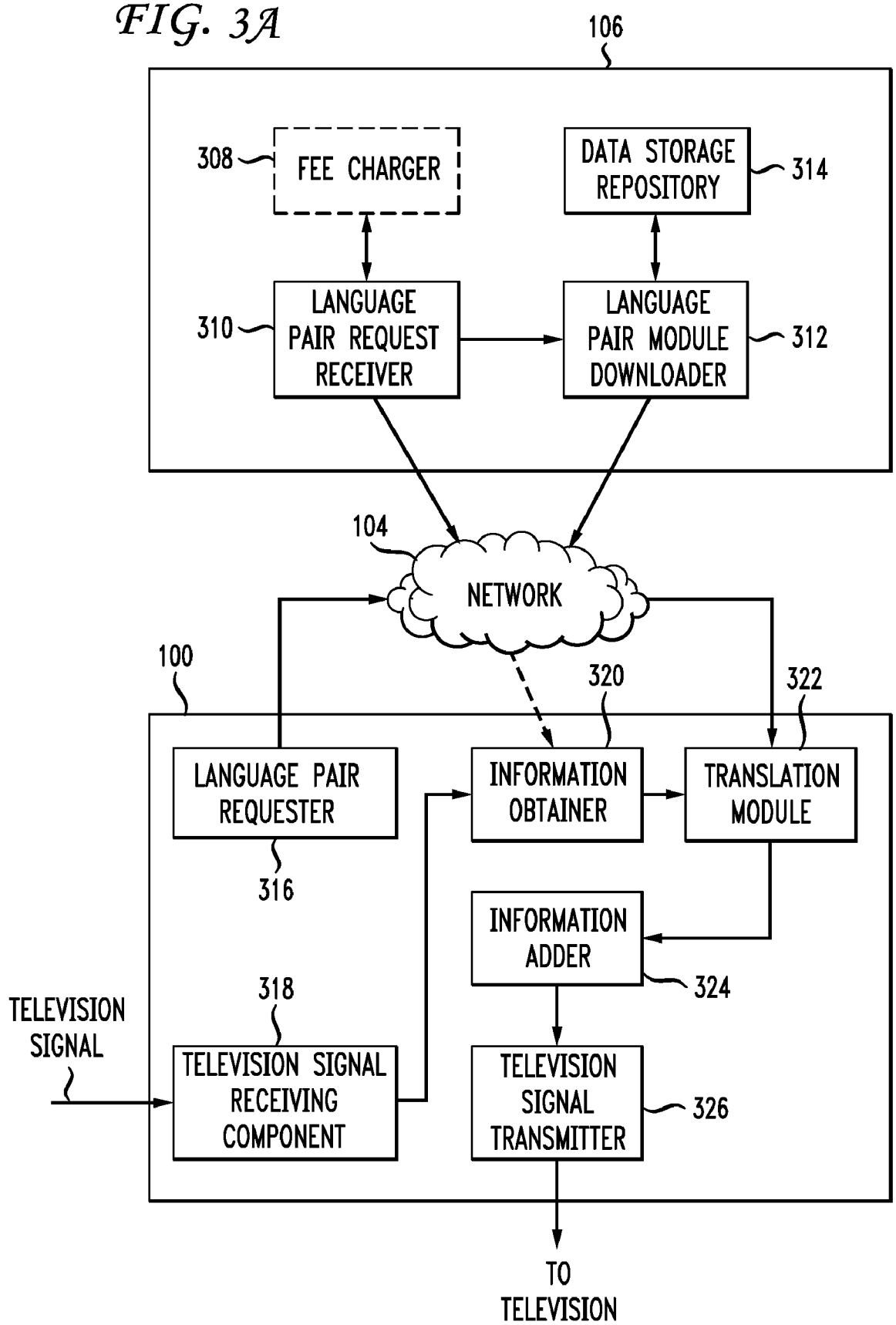
FIG. 3A illustrates a functional block diagram of the first embodiment of FIG. 1A.

FIG. 3A illustrates a functional block diagram of the exemplary first embodiment of the invention, shown in FIG. 1A. The exemplary first embodiment may include processing device 100, network 104 and processing device 106. Processing device 106 may include an optional fee charger 308, a language pair request receiver 310, a language pair module downloader 312 and a data storage repository 314. Processing device 100 may include a language pair requester 316, a television signal receiving component 318, an information obtainer 320, a translation module 322, an information adder 324 and a television signal transmitter 326.

Processing device 100 may be located locally with respect to television 102. Processing device 100 may be a device that receives a television signal and outputs a television signal to television 102. Processing device 106 may be located remotely from television 102. Processing device 106 may have access to language pair modules for downloading to processing device 100 in exchange for a fee.

Language pair requester 316 of processing device 100 may be a user interface that permits a subscriber to request a language pair module from language pair request receiver 310 of processing device 106 via network 104. In one implementation, language pair requester 316 may communicate with language pair request receiver 310 via a network browser, such as, for example, Internet Explorer, available from Microsoft Corporation of Redmond, Wash. or other browsers. Using language pair requester 316, a subscriber may be presented with a number of language pair modules from which to choose. Each language pair module may have an associated source language and an associated target language. For example, one language pair module may be associated with French as a source language and English as a target language and may be used to translate French text to English text.

Language pair request receiver 310 of processing device 106 may receive the language pair request from processing device 100 via network 104 and may inform fee charger 308 of the request. Fee charger 308 may determine a fee to charge the requesting subscriber. The fee may be based, at least in part, on an amount of time the requested language pair module is to be available for use by the subscriber. In another implementation, fee charger 308 may determine a fee based, at least in part, on a particular source language and target language associated with the requested language pair module. Other fee determination schemes may be used in other implementations. In other implementations, a subscriber may not be charged a fee in exchange for agreeing to receive commercial messages.

Language pair request receiver 310 may inform language pair module downloader to load the requested language pair module to requesting processing device 100. Language pair module downloader 312 may then access data storage repository 314, which may include a number of language pair modules, each having an associated source language and an associated target language. Language pair module downloader 312 may then download the requested language pair module, via network 104 to processing device 100, where the language pair module may be installed for use with translation module 322.

Television receiving component 318 of processing device 100 may receive a television signal, which may include information in a source language. The information may be in a source language and may include, for example, text captioning, subtitles, speech, or other data. Information obtainer 320 may obtain the information from the television signal as text in the source language. In one implementation, information obtainer 320 may include an automatic speech recognizer (ASR), which may recognize speech in a source language in the television signal and may produce corresponding text. In another implementation, information obtainer 320 may recognize text captioning in the television signal and may produce the corresponding text. In yet another implementation, information obtainer may include an optical character recognizer (OCR) to perform character recognition on graphical characters, such as used for subtitles, to produce text. In an implementation in which information obtainer 320 includes an ASR, processor 106 may obtain a source language model for speech recognition from, for example, data repository 312, for downloading to the ASR included within information obtainer 320.

Translation module 322 may translate the text in the source language to text in the target language. U.S. patent application Ser. No. 10/058,995, filed in the U.S. Patent and Trademark Office on Jan. 30, 2002, discloses a method for translating a source language to a target language, which may be used with implementations of the invention. U.S. patent application Ser. No. 10/058,995 is incorporated by reference herein in its entirety.

Information adder 324 may receive the target language text as input and may add translated information based on the target language text into the television signal. In one implementation, information adder 324 may add text captioning in the target language into the television signal. In another implementation, information adder 324 may generate speech based on the target language text and may add the generated speech into the television signal. In yet another implementation, information adder 326 may generate subtitles based on the translated text and overlay the subtitles onto the television signal. In an implementation that generates speech, processing device 106 may download a speech generation module for the target language to information adder 324 from data storage repository 314. Television signal transmitter 326 may then provide the television signal, with the translated information, to television 102.

FIG. 3B illustrates a functional block diagram corresponding to the second embodiment shown in FIG. 1B. In this embodiment, processing device 100 may be located remotely from television 102 and may communicate with television 102 via network 104. Processing device 100 may optionally include fee charger 308, language pair request receiver 310, language pair module downloader 312, data storage repository 314, television signal receiving component 318, text captioning extractor 320, translation module 322, text captioning inserter 324 and television signal transmitter 326.

A subscriber may access language pair request receiver via network 104 by using a browser, such as, for example, Internet Explorer available from Microsoft Corporation of Redmond, Wash., or another browser. The subscriber may access language pair request receiver 310 which may present the subscriber with a list of available language pair modules after the subscriber provides his or her account information. Upon receiving a request for a language pair module, language pair request receiver 310 may optionally inform fee charger 308 of the request. Fee charger 308 may then determine a fee in a same manner as described previously with respect to FIG. 3A. Fee charger 308 may then inform language pair request receiver 310 to proceed. In other implementations, a subscriber may not be charged a fee in exchange for agreeing to receive commercial messages.

Language pair request receiver 310 may then inform language pair module downloader 312 to obtain the requested language pair module from data storage repository 314 and download the requested language pair module to translation module 322.

Television receiving component 318 of processing device 100 may receive a television signal, which may include information in a source language. The information may be in a source language and may include, for example, text captioning, subtitles, speech, or other data Information obtainer 320 may obtain the information from the television signal as text in the source language. In one implementation, information obtainer 320 may include an ASR, which may recognize speech in a source language in the television signal and may produce corresponding text. In another implementation, information obtainer 320 may recognize text captioning in the television signal and may produce the corresponding text. In yet another implementation, information obtainer 320 may include an optical character recognizer (OCR) to perform character recognition on graphical characters, such as used for subtitles, to produce text. In an implementation in which information obtainer 320 includes an ASR, processor 100 may obtain a source language model for speech recognition from, for example, data repository 312, for downloading to the ASR included within information obtainer 320 via language model downloader 312.

Translation module 322 may translate the text in the source language to text in the target language in the same manner as described with respect to FIG. 3A.

Information adder 324 may receive the target language text as input and may add translated information based on the target language text into the television signal. In one implementation, information adder 324 may add text captioning in the target language into the television signal. In another implementation, information adder 324 may generate speech based on the target language text and may add the generated speech into the television signal. In yet another implementation, information adder 326 may generate subtitles based on the translated text and overlay the subtitles onto the television signal. In an implementation that generates speech, processing device 106 may download a speech generation module for the target language to information adder 324 from data storage repository 314. Television signal transmitter 326 may then provide the television signal, with the translated information, to television 102 by transmitting the television signal via network 104 to television 102.

Exemplary Process

FIG. 4 is a flowchart of an exemplary process that may be used in implementations consistent with the principles of the invention. The process may begin by performing act 400. Act 400 may include sub-acts 402-408, which may be performed in some implementations to request, download and install one or more language pair modules or other modules, such as, for example, a language model for an ASR or a speech generator module for a target language. Act 400 may begin by language pair request receiver 310 receiving a request for a language pair module (sub-act 402). The request may be from language pair requester 316 via network 104, or may be from a connection to language pair request receiver 310 via a network browser or other connection means Optional fee charger 308, if present, may receive information from language pair request receiver 310 with respect to the requested language pair and a subscriber's account information. Fee charger 308 may determine a fee and charge the subscriber accordingly (sub-act 404). As previously mentioned, the fee may be based, at least in part, on a particular language pair requested, on an amount of time the language pair module may be available for use by the subscriber, a combination of the above, or other methods. In some implementations, a subscriber may not be charged a fee, in exchange for receiving commercial messages. Language pair request receiver 310 may inform language pair module downloader 312 to access the requested language pair module in data storage repository 314 (sub-act 406) and download the language pair module to translation module 322 for installation (sub-act 408). In one implementation, the downloaded language pair module may become unusable after an expiration of a time period for which the subscriber paid for use of the language pair module. In other implementations, language pair module downloader 312 may download a language model for an ASR, which may be included in information adder 324, or may download a speech generator for a target language to information adder 324.

Next, television signal receiving component 318 may receive a television signal that may include information in a source language (act 410). The information may be in a source language and may include, for example, text captioning, subtitles, speech, or other data. Information obtainer 320 may then obtain the information as text from the received television signal (act 412). Translation module 322 may then translate the source language text to target language text (act 414). Information adder 324 my then add translated information based on the target language text into the television signal (act 416). In one implementation, information adder 324 may add text captioning in the target language into the television signal. In another implementation, information adder 324 may generate speech based on the target language text and may add the generated speech into the television signal. In yet another implementation, information adder 326 may generate subtitles based on the translated text and overlay the subtitles onto the television signal. Television signal transmitter 326 may then send the television signal to television 102, where the transmitted program may be viewed with the translated information in the target language (act 418). Acts 410 through 418 may then be performed repeatedly.

In accordance with the embodiment of FIG. 3A, processing device 100 may be a computer, such as a laptop, notebook or desktop computer. The subscriber may request and load any desired language pair modules into translation module 322 of processing device 100 or may load any other desired modules before leaving for a trip to a foreign country. While in the foreign country, the subscriber may place processing device 100 at a point between television 102 and a television signal source, such that processing device may obtain information in a source language from the television signal and may add translated information in a target language to the television signal for delivery to television 102.

In accordance with the embodiments of FIGS. 3A and 3B, processing device 100 may store received television signals in memory 230 and may look ahead to stored information received after the current television signal being processed. Thus, processing device 100 may introduce a delay between the time a television signal is received by processing device 100 and a time that the television signal is delivered to television 102.

CONCLUSION

The above-described embodiments are exemplary and are not limiting with respect to the scope of the invention. Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Further, in other implementations, hardwired logic may be used instead of processors, or one or more application specific integrated circuits (ASICs) may be used in implementations consistent with the principles of the invention. In addition, implementations consistent with the principles of the invention may have more or fewer acts than as described, or may implement acts in a different order than as shown. Accordingly, the appended claims and their legal equivalents should only define the invention, rather than any specific examples given.

We claim as our invention:

1. A method for providing an on demand translation service, the method comprising:
   making available, for use by a subscriber, a translation module including at least one language pair module, having an associated source language and an associated target language, for translating a source language to a target language;
   charging the subscriber a fee for use of the requested on demand translation service during a paid-for period, after which the translation module expires;
   receiving a video signal including information in the source language;
   obtaining the information as text from the video signal;
   translating the text from the source language to the target language by use of the translation module;
   adding translated information based on the translated text into the video signal; and
   sending the video signal including the translated information to a display device.

2. The method of claim 1, wherein the video signal includes an audio portion.

3. The method of claim 2, wherein obtaining the information as text from the video signal comprises performing speech recognition on the information in the audio portion to produce the text in the source language.

4. The method of claim 2, wherein sending the received video signal including the translated information in the target language to a display device comprises:
   generating speech in the target language from the translated information; and
   including the generated speech in the audio portion of the video signal.

5. The method of claim 1, wherein an amount of the fee is based, at least in part, on an amount of time the on demand translation service is to be made available to the subscriber.

6. The method of claim 1, wherein an amount of the fee is based, at least in part, on the at least one language pair module used.

7. The method of claim 1, wherein:
   the translating of the text from the source language to the target language is performed in a set-top box configured to receive the video signal including the information in the source language and to output the video signal with the translated information in the target language.

8. The method of claim 1, wherein:
   the translating of the text from the source language to the target language is performed in a laptop computer, a notebook computer or a desktop computer configured to receive the video signal including the information in the source language and to output the video signal with the translated information in the target language.

9. The method of claim 1, further comprising:
   storing a plurality of video signals including a plurality of information in the source language, wherein:
   the translating the text from the source language to the destination language further comprises:
      introducing a delay between receiving the plurality of video signals and delivering at least one of the plurality of video signals by looking ahead to at least one of the plurality of video signals received after the video signal currently being processed.

10. The method of claim 1, wherein:
    the translating the text from the source language to the target language is performed in a processing device remotely located from the display device, and
    the display device is configured to receive the video signal including the translated information via a network.

11. A non-transitory machine-readable storage medium having recorded thereon instructions for at least one processor to provide an on demand translation service, the non-transitory machine-readable storage medium comprising:
    instructions for making available, for use by a subscriber, a translation module including at least one language pair module for translating a source language to a target language;
    instructions for charging the subscriber a fee for use of the on demand translation service during a paid-for period, after which the translation module expires;
    instructions for receiving information in the source language from a video signal;
    instructions for obtaining the information as text from the video signal;
    instructions for translating the text from the source language to the target language;
    instructions for adding translated information based on the translated text into the received video signal; and
    instructions for sending the received video signal including the translated information to a display device.

12. The non-transitory machine-readable storage medium of claim 11, wherein the video signal includes an audio portion.

13. The non-transitory machine-readable storage medium of claim 12, wherein the instructions for obtaining the information as text from the video signal comprises instructions for performing speech recognition on the information in the audio portion to produce the text in the source language.

14. The non-transitory machine-readable storage medium of claim 11, instructions for sending the video television signal including the translated information in the target language to a display device further comprise:
   instructions for generating speech in the target language from the translated information; and
   instructions for including the generated speech in the audio portion of the video signal.

15. The non-transitory machine-readable storage medium of claim 11, further comprising instructions for determining an amount of the fee based, at least in part, on an amount of time the on demand translation service is to be made available to the subscriber.

16. The non-transitory machine-readable storage medium of claim 11, wherein an amount of the fee is based, at least in part, on an amount of time the on demand translation service is to be made available to the subscriber.

17. The non-transitory machine-readable storage medium of claim 11, further comprising instructions for determining an amount of the fee based, at least in part, on the at least one language pair module used.

18. The non-transitory machine-readable storage medium of claim 11, wherein the instructions for translating the text from the source language to the target language include instructions for a processor in a set-top box to perform the translating of the text.

19. The non-transitory machine-readable storage medium of claim 11, wherein the instructions for translating the text from the source language to the target language include instructions for a processor in a laptop computer, a notebook computer or a desktop computer to perform the translating of the text.

20. The non-transitory machine-readable storage medium of claim 11, wherein the instructions for translating the text from the source language to the target language include instructions for a processor in a processing device located remotely from the display device to perform the translating of the text.

21. A system for providing an on demand translation service, the system comprising:
   a video signal receiving component configured to receive a video signal having an audio portion, the audio portion including speech in a source language;
   a speech recognizer configured to obtain the speech in the source language, from the audio portion, as text;
   a translation module configured to translate the text from the source language to a target language for a subscriber using one of a plurality of language pair modules, wherein the translation module expires after a paid-for period of time;
   an information adder configured to insert, into the video signal, translated information based on the translated text from the translation module; and
   a video signal transmitter configured to transmit the video signal including the translated information.

22. The system of claim 21, further comprising:
   a fee charger configured to charge an amount based, at least in part, on an amount of time the on demand translation service is to be made available to the subscriber.

23. The system of claim 21, further comprising:
   a fee charger configured to charge an amount based, at least in part, on the language pair module used by the translation module.

24. The system of claim 21, further comprising:
   a data storage repository including the plurality of language pair modules, each of the language pair modules having an associated source language and an associated target language;
   a language pair module downloader configured to access the data storage repository and to download a requested one of the plurality of language pair modules.

25. The system of claim 21, further comprising:
   a set-top box including therein the video signal receiving component, the speech recognizer, the translation module, the information adder and the video signal transmitter.

26. The system of claim 21, further comprising:
   a laptop computer, a notebook or a desktop computer including the video signal receiving component, the speech recognizer, the translation module, the information adder and the video signal transmitter.

27. A system for providing an on demand translation service, the system comprises:
   means for making available, for use by a subscriber, at least one language pair module, having an associated source language and an associated target language, for translating a source language to a target language;
   means for charging the subscriber a fee for use of the on demand translation service during a paid-for period, after which the translation module expires;
   means for receiving a video signal including information in the source language;
   means for obtaining the information as text from the video signal;
   means for translating the text from the source language to the target language by use of the at least one language pair module;
   means for adding translated information based on the translated text into the video signal; and
   means for sending the video signal including the translated information in the target language to a display device.

* * * * *